Oct. 20, 1964   R. B. WILLIAMS ET AL   3,153,756
PROCESS FOR CONDUCTING QUANTITATIVE ANALYSES
Original Filed May 31, 1955   3 Sheets-Sheet 3

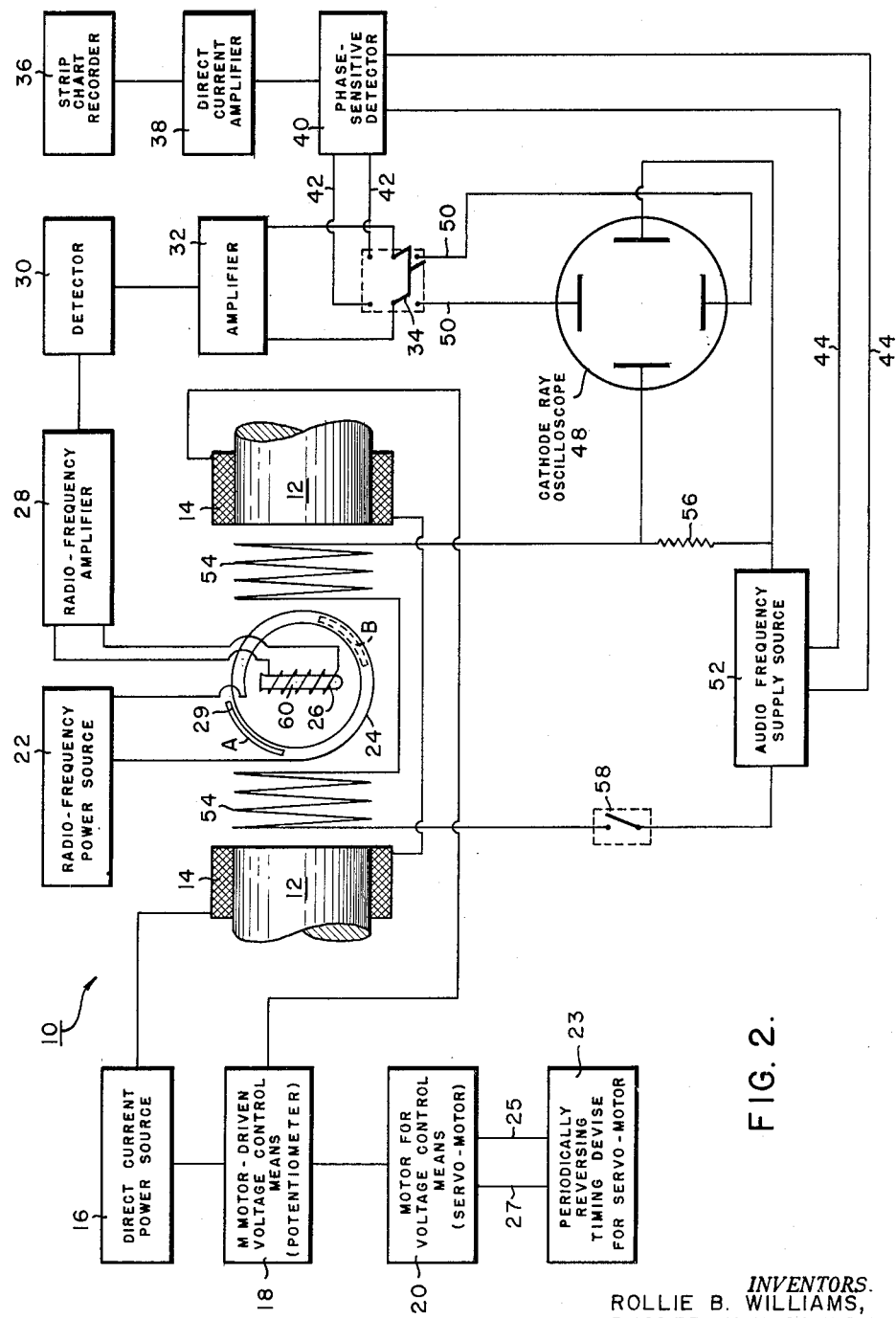

INVENTORS.
ROLLIE B. WILLIAMS,
RHODERICK K. SAUNDERS,
BY Frank S. Troidl
ATTORNEY.

3,153,756
PROCESS FOR CONDUCTING QUANTITATIVE ANALYSES
Rollie B. Williams and Rhoderick K. Saunders, Baytown, Tex., assignors, by mesne assignments, to Esso Research and Engineering Company, Elizabeth, N.J., a corporation of Delaware
Original application May 31, 1955, Ser. No. 512,115, now Patent No. 3,048,772, dated Aug. 7, 1962. Divided and this application Aug. 30, 1961, Ser. No. 134,991
3 Claims. (Cl. 324—.5)

This invention relates to a process for obtaining by nuclear magnetic resonance means a signal which is a direct quantitative measure of the quantity of a nuclear species (i.e., a particular kind of chemical element) contained in a substance, to the utilization of the signal thus obtained and to apparatus useful in obtaining the signal.

This application is a division of application Serial No. 512,115, filed May 31, 1955, in the names of Rollie B. Williams and Rhoderick K. Saunders, entitled "Process for Conducting Quantitative Analyses," and now Patent No. 3,048,772, granted August 7, 1962.

In accordance with the present invention a signal which is a direct quantitative measure of the quantity of a nuclear species is obtained by detecting the maximum of intensity of a nuclear magnetic resonance dispersion obtained by polarizing a nuclear species contained in a single phase free-flowing liquid comprising a sample in a unidirectional primary magnetic field by precessing the polarized nuclei with an alternating radio-frequency magnetic field applied at right angles to the primary magnetic field and by scanning the resonance band of the processing nuclear species while modulating the primary magnetic field in the direction thereof with an audio-frequency alternating magnetic field having an intensity and frequency for the rate of scan employed such as to cause the polarized nuclei to precess in phase with the radio-frequency magnetic field, the period of modulation being less than spin-lattice relaxation time of the nuclear species and the period of scan being greater than spin-lattice relaxation time. A dispersion signal obtained in this manner will be a substantially wholly positive, substantially bilaterally symmetrical nuclear magnetic resonance dispersion signal having a nonrepetitive strength value at the center of the resonance band.

The objects and advantages of the present invention will be apparent from the following specification when considered in conjunction with the accompanying drawings wherein:

FIG. 2 is a schematic drawing of a nuclear magnetic resonance spectrometer and of the wiring therefor;

Throughout the specification and drawings, like reference numerals refer to like parts.

*Background Information*

Figure 1:
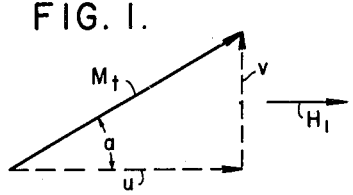
FIG. 1 is a vector diagram which is also explanatory of the precession of a nucleus.

The general subject matter of nuclear magnetic resonance is dealt with in numerous publications, such as the article entitled "Magnetic Resonance" by K. K. Darrow (Bell System Technology Journal, vol. 32, pages 74–99 and 384–405, 1953), the article entitled "Nuclear Magnetism" by Felix Bloch (American Scientist, vol. 43, pages 48–62, January 1955), Patent No. 2,561,489 to Bloch et al. and Patent No. 2,561,490 to Varian.

Briefly, and by way of summary, it may be pointed out that those nuclear species which contain an odd number of protons, an odd number of neutrons or an odd number of both will generally have magnetic moments and spin angular momenta. If a substance containing such a nuclear species is placed in a strong magnetic field, it will be found that the spin axes of the nuclei will be brought into alignment in the magnetic field so that such axes are polarized with respect to the field. As a consequence of the quantum nature of angular momentum, the spin axes of the nuclei can assume only a limited number of stable orientations with respect to each other and with respect to the magnetic field. It turns out that the number of possible orientations is $2I+1$.

The potential energy of a magnetic dipole in a magnetic field depends upon its orientation with respect to the field and it follows, therefore, that there are $2I+1$ different possible energy levels of a nucleus in a magnetic field.

It is possible to cause a nucleus aligned in a magnetic field to change from a lower energy level to the next higher energy level through the absorption of radiation (i.e., through nuclear magnetic resonance absorption). This happens when radiation from an external source is utilized, the frequency of such radiation in cycles per second ($\nu$) times Planck's constant ($h$) being equal to the energy separation (E) between energy levels (i.e., $h\nu=E$). This condition is commonly referred to as a condition of "resonance." The radiation energy is commonly supplied by means of an alternating magnetic field in the radio-frequency range, which radio-frequency field is applied at right angles to the strong magnetic field in which the nuclei are placed. The applied radiation energy causes the aligned nuclei to precess about their axes in the manner of a gyroscope at a frequency of precession substantially equal to the frequency of the radio-frequency field. In an ideal situation there would be only one resonance frequency for a given nuclear species at a given field strength since the energy separation between any two adjacent energy levels of the same nuclear species is the same in this situation.

Actually there is a band of frequencies rather than a single frequency. The main reason for this is that the field at a given nucleus is a superposition of the external field plus the magnetic fields produced by the magnetic dipole moments of the nearest neighboring nuclei.

The process of changing the magnitude of the primary magnetic field, the frequency of the radio-frequency, or both, in order to traverse the resonance band of a nuclear species is commonly referred to as the process of "scanning the resonance band" and the rate of change is commonly referred to as the "rate of scan." When one or both of the variables are increased in strength from an initially low value to traverse the resonance band, the operation is commonly referred to as a "forward" scanning operation; and when one or both such variables are decreased from an initially high value to traverse the resonance band, the process is normally referred to as a "reverse" scanning operation.

As indicated, the members of a nuclear species will precess during resonance. If at a given instant of time the applied radio-frequency magnetic field is suddenly removed, the nuclei will continue to precess freely for a subsequent period of time. However, since each nucleus will be in a slightly different magnetic field (produced by the interaction of the primary magnetic field with the magnetic fields of neighboring nuclei), the "free" precession frequency of each nucleus will become slightly different. After a sufficient period of time has elapsed, the various precessing nuclei will be completely out of phase. A measure of the time required for this to happen is referred to as the spin-spin relaxation time (since it is dependent on the interaction of adjacent nuclear spins) and is usually referred to by the symbol $T_2$. $T_2$ is normally measured in terms of the inverse band width of a resonance band expressed in terms of frequency.

When a nuclear species is caused to precess, other effects also occur which affect the amount of energy that is absorbed. Thus, the radio-frequency radiation field at the resonant frequency induces transitions from a higher to a next lower energy state. The relative number of nuclei in the lower state increases as the temperature is decreased and therefore the resonance absorption tends to increase as the temperature is decreased. When there is an absorption of radiation, the rate of transition of nuclei from lower to higher states is greater than that from higher to lower because of the excess number in the lower states. If this process were to continue unabated, a situation would arise in which the various states would become equally populated so that no net absorption of energy would occur. Such a condition never actually occurs because there is another mechanism by which nuclei in the upper energy levels may lose energy and thereby establish equilibrium. This comes about through the interaction of the excited nuclei with the surrounding lattice composed of molecules and other atoms whereby energy is given up to this lattice. The exchange of energy takes place through interaction of the magnetic dipole moments of the nuclei and the fields of the other molecules and atoms. This phenomenon is commonly referred to as the spin-lattice relaxation time and is usually referred to by the symbol $T_1$. Spin-lattice relaxation time ($T_1$) is measured as the time required for the exchange of energy between spin and lattice to take place.

The foregoing is an oversimplification since the net amount of energy that will be absorbed by a resonating (i.e., precessing) nuclear species is dependent upon a multiplicity of factors, some of which are known or determinable and some of which are unknown or undeterminable. Thus, the strength of the magnetic field, the temperature of the sample, the relative abundance of the nuclear species in the sample, the environmental interrelationship of the various nuclei to each other, etc., will all have an effect upon the net amount of energy that is absorbed.

With reference to FIG. 1, the vectorial summation ($M_t$) of components of the resonant moments perpendicular to the primary magnetic field in the plane of $H_1$ will normally bear a phase relationship to the applied radio-frequency magnetic field $H_1$.

Such a phase relationship at one instant of time is vectorially shown in FIG. 1 wherein the magnetude of $M_t$ and the phase relationship thereof with respect to $H_1$, indicated by the angle "$a$," are shown. It will also be seen from FIG. 1 that $M_t$ is actually the vectorial sum of a component "$v$" and a component "$u$." When the nuclear species precesses in phase with the radio-frequency field $H_1$, there will not be a "$v$" component. The "$v$" component is commonly referred to as the absorption component and the "$u$" component is commonly referred to as the dispersion component. It will be apparent that measurement of the intensity of either the absorption or dispersion component will give a measure of the extent to which energy has been absorbed due to precession of members of a nuclear species. It will also be apparent that the absorption component "$v$" will be in phase quadrature with the applied radio-frequency field and that the dispersion component "$u$" will be in phase therewith. As a general rule, the angle "$a$" will constantly change as the resonance band is scanned. As a consequence, the absorption component "$v$" and the dispersion component "$u$" will change in intensity during the scanning operation.

A measure of the amount of energy absorbed by a precessing nuclear species during scanning operations may be obtained by detecting the intensity of either the absorption component "$v$" or the dispersion component "$u$."

*Instrumentation*

Nuclear magnetic resonance spectrometers have been constructed which are capable of measuring either the "$v$" (absorption) component, the "$u$" (dispersion) component, or both, such spectrometers being of the balanced bridge type, the oscillating detector type, the induction type, etc. In essence, such spectrometers comprise the same basic elements including (1) a transmitter for producing a source of radio-frequency power, (2) an inductance coil to receive the output power from the transmitter, which coil is positioned about a sample to be investigated, (3) a receiver for accepting the resonance (e.g., scanning) signal produced at the sample location through some type of coupling arrangement, (4) a large magnet, in the field of which the sample and coil arrangements are situated, and (5) suitable means for registering the nuclear magnetic resonance signal.

The construction of an inductance type of nuclear magnetic resonance type spectrometer is schematically shown in FIG. 2. In accordance with this construction there is provided an electromagnet, designated generally by the number 10, comprising cores 12—12 and coils 14—14, the coils 14—14 being connected in series with a suitable direct current supply source 16 which provides the current to be used in generating the primary magnetic field. For many purposes it is desirable to provide suitable means for periodically varying the strength of the current flowing through the coils 14—14, such means comprising, for example, a suitable voltage control means 18 such as a potentiometer of the so-called "Helipot" type which is provided with a servomotor 20 for periodically reversing the direction of voltage change in response to a signal derived from a timing mechanism 23, a "forward" (voltage-increasing) signal being transmitted from the timing device 23 to the servomotor 20 through electrical connection 25 and a "reverse" (voltage-decreasing) signal being transmitted through electrical connection 27. A radio-frequency power source 22 is provided for transmitting a radio-frequency signal through a transmission coil 24. An inductance coil 26 is also provided.

Suitable means are also provided to regulate the leakage flux that is developed during operations in order to prevent a coupling between transmission coil 24 and the inductance coil 26. Such means may comprise a rotatable, semicircular paddle 29 formed of an electroconductive material, such as copper (see Bloch et al. Patent No. 2,561,489). Generally, additional paddles (not shown) similar to the paddle 29 are utilized to provide for a finer adjustment, such additional paddles being concentrically connected with the paddle 29 for rotation therewith and preferably being formed of a material less electroconductive than copper, such as graphite. The paddle 29 may be positioned (e.g., position A) by any suitable means (not shown) to induce a current in the inductance coil 26 in phase with the radio-frequency field or the paddle 29 may be rotated to a second position (e.g., position B which is shown by dotted lines) to induce a current in the coil 26 which is in phase quadrature with the radio-frequency field.

The inductance coil 26 is connected with a suitable radio-frequency amplifier 28, the amplifier 28 being connected with a detector 30 which, in turn, is connected with an amplifier 32. The amplifier 32 may be of any suitable construction comprising, for example, a so-called "audio-amplifier" which amplifies only those components of the current transmitted by the detector 30 which have a frequency of about 10 cycles per second or more or, as another example, a so-called "direct current amplifier" which amplifies the components having a frequency of less than 10 cycles per second in addition to the components having a frequency of more than 10 cycles per second. The amplifier 32 is connected with suitable current detecting means such as a strip-chart recorder 36 or a cathode ray oscilloscope 48. This may be accomplished, for example, by connecting the audio-amplifier 32 with a double-pole switch 34 through leads 33—33, the switch 34 having a first set of leads 42—42 connected with a strip-chart recording device and a second set of leads 50—50 connected with a cathode ray oscilloscope 48.

If a strip-chart recorder 36 is to be used, a direct current amplifier is preferably provided as the amplifier 32, and the recorder 36 is connected with the direct current amplifier 38 which, in turn, is connected with a phase-sensitive detector 40. The phase-sensitive detector 40 is connected with the switch 34 through the leads 42—42 and is also connected with a suitable audio-frequency reference voltage supply source 52 to be described subsequently.

Another type of detecting apparatus which may be used comprises a cathode ray oscilloscope 48 having the vertical plates thereof connected with the leads 50—50 of the double-pole switch 34. When an oscilloscope 48 is employed, the amplifier 32 may be either an audio-amplifier or a direct current amplifier, an audio-amplifier being preferred generally. The horizontal plates of the oscilloscope 48 are connected with a suitable alternating current supply source 52 by means of a circuit comprising coils 54—54 and a bridging resistor 56. The coils 54—54 are positioned between the cores 12—12 of the electromagnet 10 to provide a means for modulating the primary magnetic field generated between the cores 12—12. There is also provided a suitable switch 58 for cutting out the coils 54—54 when desired.

As a general rule, the absorption component "$v$" of a nuclear species is most conveniently detected by means of the cathode ray oscilloscope 48 whereas the dispersion component "$u$" is most conveniently detected by means of the strip-chart recorder 36. However, either detector may be used.

There is also provided a sample holder 60 of any suitable construction which is positioned within the inductance coil 26. The sample holder 60 is adapted to contain a material comprising a single phase, free-flowing liquid containing a nuclear species whose resonance band is to be scanned by nuclear magnetic resonance spectroscopic means.

Structurally, the axis of the radio-frequency transmitter 24 is positioned at right angles to the axis of the cores 12—12, and the axis of the inductance coil 26 is positioned at right angles to the axis of the radio-frequency transmitter 24 and the axes of the cores 12—12.

The manner of operation of the nuclear magnetic resonance spectrometer may be varied widely. As one example, and when the primary magnetic field generated between the cores 12—12 is to be modulated, the switch 58 is closed and the double-pole switch 34 is connected with the terminals 50—50. The motor drive 20 for the potentiometer 18 is rendered inoperative so that a direct current of constant voltage will flow through the coils 14—14 to thereby generate a primary magnetic field of known substantially constant strength between the cores 12—12. The flux paddle 29 is positioned at position A when a dispersion signal is to be obtained or at position B when an absorption signal is to be detected. A sample containing a nuclear species to be detected is placed in the sample holder 60 and radio-frequency signal of the proper frequency is transmitted through the coil 24. At the same time an audio-frequency alternating current from the alternating current supply source 52 is caused to flow through the coils 54—54 (e.g., a 60 cycle current). The magnetic flux generated by the coils 54—54 will sweep (i.e., modulate) the primary magnetic field generated by the cores 12—12 and thereby simultaneously horizontally deflect the beam of the cathode ray oscilloscope 48. A current will be induced in the coil 26, which current will be amplified by the radio-frequency amplifier 28, detected by the detector 30, and still further amplified by the amplifier 32 whereby the vertical deflection of the beam of the cathode ray oscilloscope 48 is controlled. As a result, an absorption or dispersion signal will be traced on the face of the oscilloscope 48.

As another example, the double-pole switch 34 is connected with the terminals 42—42 leading to the phase sensitive detector 40 and the motor drive 20 for the potentiometer 18 is rendered operative to slowly periodically vary the voltage of the current flowing through the coils 14—14. The electrical current induced in the coil 26 is amplified in the described manner. The audio-amplifier 32 is connected to the phase sensitive detector 40 which is also connected with the audio-frequency voltage supply source 52 to provide a reference voltage, and the phase sensitive detector is connected with the strip-chart recorder 36 which records the signal transmitted thereto.

It will be apparent that the switch 58 may be closed and the motor drive 20 for the potentiometer 18 rendered operative in order to vary the strength of the primary magnetic field generated between the cores 12—12 from an initial value while simultaneously modulating the same with the audio-frequency magnetic field generated by the coils 54—54. In this situation the strip-chart recorder 36 is preferably employed as the detecting means.

The absorption curves and the dispersion curves that are obtained by the foregoing methods will have specifically different characteristics, and, moreover, the characteristics of such curves will be dependent upon the specific operating conditions employed. As a result, specifically different absorption and dispersion curves are obtained when the operating conditions are varied. Among the operating conditions that will be significant in determining the characteristics of such curves are the strength of the primary magnetic field, the strength of the applied radio-frequency alternating magnetic field, the rate at which the primary magnetic field, the radio-frequency field or both (as the case may be) are changed to scan the resonance band of a nuclear species, and, when employed, the frequency and intensity of the modulating alternating magnetic field.

*Discussion of Factors Affecting a Quantitative Determination of a Nuclear Species*

The present invention is directed to a process for obtaining by nuclear magnetic resonance spectroscopic means a signal which is a direct measure of the quantity of a nuclear species contained in a single phase free-flowing liquid comprising a sample and to the utilization of such a signal.

In general, in accordance with the present invention, a direct quantitative measure of the quantity of a nuclear species contained in a single phase free-flowing liquid comprising a sample is obtained by detecting the first maximum of strength of a substantially wholly positive nuclear magnetic resonance dispersion signal having a nonrepetitive strength value at the center of the resonance band of the nuclear species.

The desired signal is obtained by polarizing the nuclear species to be determined and precessing such polarized nuclear species in phase with radio-frequency alternating magnetic field of precession while modulating the primary magnetic field in the direction thereof with an audio-frequency alternating magnetic field having a period of modulation which is less than the spin-lattice relaxation time of the nuclear species, the scan period being greater than spin-lattice relaxation time. As indicated, there is obtained, under such circumstances, a bilaterally symmetrical dispersion signal having a nonrepetitive strength value at the center of the resonance band of the nuclear species.

A wide variety of operating conditions may be utilized in obtaining dispersion signals having the above-described characteristics. This may be graphically illustrated by considering representative types of dispersion signals that are obtainable in accordance with the present invention when scanning the resonance band for the hydrogen contained in a sample consisting, for example, of 85 weight percent of glycerin and 15 weight percent of water. Thus, if the hydrogen nuclei are polarized in a primary magnetic field having an average strength of about 10,000 gauss, which primary magnetic field is varied in strength to forwardly scan the hydrogen resonance band while being modulated in the direction thereof with a 60 cycle audio-frequency magnetic field having an intensity of about 0.2 gauss, and if a radio-frequency magnetic field having a frequency of about 42.6 megacycles per second and a strength of about 0.3 gauss is applied at right angles to the primary magnetic field, the hydrogen nuclei will be polarized and precessed in phase with the radio-frequency field. If the resonance band for the hydrogen nuclei is scanned over about a 50 second interval by progressively increasing the strength of the primary magnetic field from an initially low value (e.g., about 9,999 gauss) by about 2 gauss, a dispersion signal D may be obtained by suitable means such as a strip-chart recorder, having a configuration similar to that shown in FIG. 3. The dispersion signal D may be employed in obtaining a direct quantitative measure of the quantity of hydrogen contained in the sample scanned in accordance with the present invention. In this situation and under the recited conditions, the audio-frequency magnetic field will have a period which is less than the spin-lattice relaxation time of the hydrogen contained in the aqueous glycerin solution. The period of scan will be greater than spin-lattice relaxation time.

It will be noted that the dispersion signal D has a comparatively low intensity at the extremities $E_1$–$E_2$ thereof, with respect to the normally constant value K of the signal outside the resonance band. It will be further noted that the dispersion signal D has a first maximum "$m$" at one side of the center of the resonance band, the intensity of which is detected in accordance with the present invention, a minimum "$o$" at the center of the resonance band and a second maximum "$m'$" at the other side of the center of the resonance band. It will be further noted that the dispersion signal D is bilaterally symmetrical and that the intensity of the same at the minimum "$o$" at the center of the resonance band is substantially equal to the intensity value K outside of the resonance band so that the dispersion signal D has a nonrepetitive strength value at the center of the resonance band.

Figure 3:
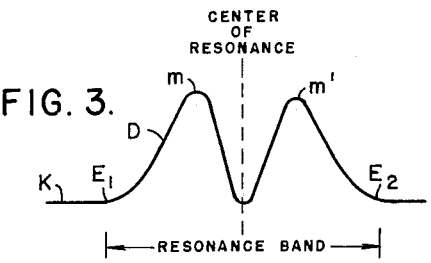
FIGS. 3 to 7 are graphic representations of dispersion signals obtainable with the nuclear magnetic resonance spectrometer shown in FIG. 2.
Figure 4:
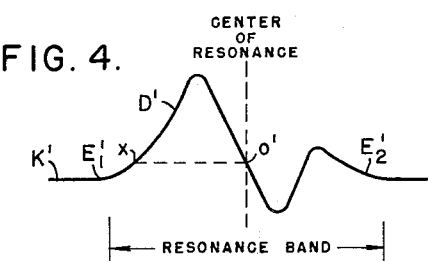

If the resonance band for the hydrogen contained in the sample of FIG. 3 is scanned under the above conditions but at a more rapid rate (e.g., about 1 second), the hydrogen nuclei likewise precess in phase with the applied radio-frequency field; but a dispersion signal D' of the type shown in FIG. 4 will be obtained. In this situation the period of scan is approximately equal to spin-lattice relaxation time. It will be noted that the dispersion signal D' is not bilaterally symmetrical and that the value of the same at the point "$o'$" at the center of the resonance band is repeated at the point "$x$" within the resonance band. It will be further noted that the dispersion signal D' has an off-center minimum "$y$" which is of negative intensity as compared with the normally constant intensity value K' outside of the resonance band.

Figure 5:
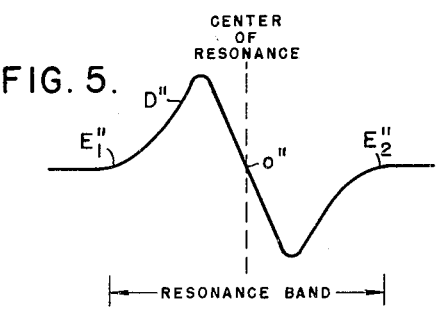

When employing a scan rate of 0.1 second and also a field modulated at 500 c.p.s., the scan period will be less than spin-lattice relaxation time; and a dispersion signal D'' of the type shown in FIG. 5 will be obtained. It will be noted that the dispersion signal D'' is not bilaterally symmetrical in that the portion $E_1''$–$o''$ thereof is positive in nature and the portion $o''$–$E_2''$ is negative in nature with respect to the normally constant intensity value K outside the resonance band.

Turning again to the operating conditions utilized in obtaining the dispersion signal D of FIG. 3 wherein a comparatively slow scanning rate of about 50 seconds was employed, a different effect is observable if the frequency of modulation of the primary magnetic field is changed. Thus, if an audio-frequency magnetic field having a lower frequency (e.g., about 1.0 cycle per second) is employed, the period of modulation will be approximately equal to spin-lattice relaxation time; and a dispersion signal $D_1$ of the type shown in FIG. 6 will be obtained. It will be noted that the dispersion signal $D_1$ is bilaterally symmetrical but is of a negative strength value at the center of the reconance band with respect to the normally constant value $K_1$ of the dispersion signal $D_1$ outside the resonance band.

Figure 6:
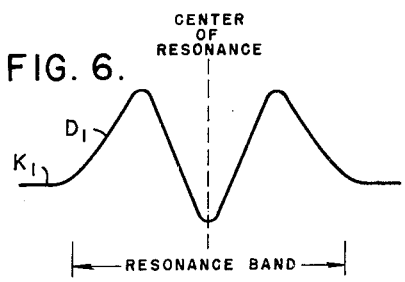
Figure 7:
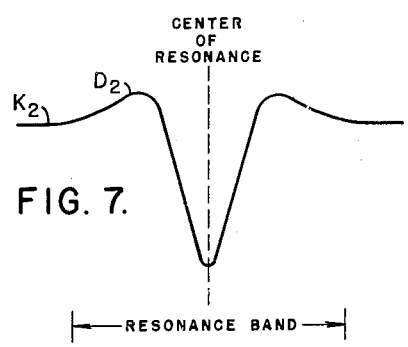

If the frequency of modulation is still further reduced (e.g., to a frequency of about $\frac{1}{10}$ cycle per second), the period of modulation will be greater than spin-lattice relaxation time and a dispersion signal $D_2$ of the type shown in FIG. 7 will be obtained, such signal being of a much more pronounced negative character than the dispersion signal of FIG. 6.

If the rate of scan and the intensity and frequency of modulation are employed which were utilized in obtaining a dispersion signal of FIG. 3 but a liquid sample less viscous than that of FIG. 3 is employed (e.g., heptane), it will be found that a dispersion signal of the type shown in FIGS. 4 or 5 will be obtained for in this situation the spin-lattice relaxation time for the hydrogen nuclei will be increased to a time greater than the scan period. In this situation it is possible to obtain a dispersion signal of the desired characteristics as shown in FIG. 3 by decreasing the rate of scan.

If the liquid sample is more viscous than that of FIG. 3 (e.g., dodecane), a dispersion signal of the type shown in FIG. 7 will be obtained for the spin-lattice relaxation time will become less than the period (i.e., frequency) of modulation. In this situation it is possible to provide the operative conditions necessary to give a dispersion signal of the type shown in FIG. 3 by increasing the frequency of modulation of the primary magnetic field.

A wide variety of operating conditions may be utilized in accordance with the modification of the present invention wherein a dispersion signal of the type shown in FIG. 3 is obtained.

For best results, the primary magnetic field in which the sample is placed should have an average strength of about 1,000 to 15,000 gauss although a somewhat greater or lesser field strength may be provided if it is so desired. Generally speaking, it is preferable to provide a primary magnetic field having a strength of about 10,000 gauss.

In accordance with this modification, the audio-frequency alternating magnetic field that is utilized in modulating the primary magnetic field should preferably have an amplitude of about 0.2 to 1.0 gauss and, for best results, it is preferable that the amplitude be equal to about half the width of the resonance band to be scanned. The frequency of the modulating current should be in the audio-frequency range and may vary from about 0.5 to 500 cycles per second.

It is necessary that the strength of the magnetic field generated by the radio transmitter be about 0.01 to 10 gauss for accurate results. As has been indicated, the frequency of the radio-frequency field to be used for a given nuclear species is dependent on the average strength of the primary magnetic field.

During operations the actual strength of the primary magnetic field is varied from a value below the average value thereof to a value above the average value in order to scan the resonance band of the nuclear species in the manner described above. Generally speaking, the total variation should be in the order of about 0.5 to 10 gauss. The variation in strength may be such that the entire resonance band is scanned or may be such that only a portion of the resonance band, up to and including the center of the resonance band, is scanned. The rate of scan may be varied from a fraction of a second to several seconds, depending on the environmental conditions of the nuclear species to be determined and on the operating conditions that are to be employed. If desired, the scanning operation may be accomplished by progressively increasing the strength of the primary magnetic field from an initial value below the average value thereof. This is commonly referred to as a "forward" scanning operation. Conversely, the strength of the primary magnetic field may be decreased from an initial value above the average value thereof; this being commonly referred to as a "reverse" scanning operation. If only a portion of the resonance band is to be scanned, operations may be conducted so that there is a forward scan into and across the center of the resonance band and a reverse scan back across the center of the resonance band and out of the resonance band, or vice versa.

There is an interrelationship of the rate of scan to the radio-frequency power and the frequency and intensity of modulation of the primary magnetic field. A dispersion signal having the desired characteristics is obtained only when these factors are properly correlated. The interrelationship is of a relative nature and is dependent on the operating conditions employed. However, the proper correlation is arrived at with comparative ease by holding two of the factors constant (e.g., rate of scan and radio-frequency power) and varying the other factors (e.g., the frequency and intensity of modulation) to obtain a dispersion signal having the desired characteristics.

Thus, by way of illustration, the radio-frequency power to be used and the rate of scan to be employed may be predetermined and the resonance band of a nuclear species may then be scanned while modulating the primary magnetic field at a given frequency and intensity of modulation. If the resultant dispersion curve is not bilaterally symmetrical, the period of scan is not greater than the spin-lattice relaxation time of the nuclear species. In this situation, the rate of scan may be decreased to provide a symmetrical dispersion signal. If the dispersion curve is not substantially wholly positive in nature, the period of modulation is not less than the spin-lattice relaxation time of the nuclear species. In this situation, the frequency of modulation may be decreased until a substantially wholly positive dispersion signal is obtained.

The sample to be tested may consist of a single phase free-flowing liquid containing the nuclear species or may comprise such a liquid in physical admixture with a solid material. Generally speaking, the liquid portion of the sample should have a viscosity of about 0.1 to 10,000 centipoise and the nuclear species to be determined should be a part of such liquid. As a consequence, the spin-lattice relaxation of the nuclear species will be approximately equal to the spin-spin relaxation time thereof. The liquid portion of the sample should be a single phase liquid. That is to say, the components of the liquid should be mutually miscible or soluble, as the case may be, so that separate phases of the liquid sample will not be formed on standing. The liquid portion of the sample should be substantially free from paramagnetic materials (e.g., should not contain more than about 0.02 molar concentration of para-magnetic atoms) for the best results.

Many substances are liquid materials having the requisite viscosity and may be used directly. If the substance is a normally gaseous material which can be liquefied by cooling or pressure application or a normally solid or highly viscous material which can be heated to form a liquid of the requisite viscosity, the sample to be tested may consist of such a material in a flowable liquid condition. However, if the substance to be tested is a solid, gas, or viscous liquid which cannot be directly converted to a liquid of the desired viscosity, it is necessary to prepare a solution of the substance in a suitable solvent whereby a liquid of the requisite viscosity is obtained. As has been indicated, the sample may also comprise a solid material.

If the solvent contains the nuclear species to be determined, this factor must be taken into consideration. Accordingly, it is generally preferable to utilize a solvent which does not contain the nuclear species to be determined. Thus, for example, if $H^1$ is to be quantitatively determined, the solvent should preferably be a composition substantially free from hydrogen such as carbon tetrachloride, carbon disulfide, etc. If a solvent such as benzene, acetone, methyl ethyl ketone, a chlorinated liquid hydrocarbon, an aromatic hydrocarbon, etc., is used, the hydrogen content of the solvent will contribute to the intensity of the dispersion signal and this contribution must be predetermined by prior analysis if an accurate determination is to be obtained.

It is to be noted in passing that it is usually preferable (although not absolutely necessary) to conduct scanning operations after the sample has been at rest for a period of time sufficient to establish steady motion of the molecules comprising the single phase, free-flowing liquid. The time required to establish steady molecular motion may be expressed in terms of the relaxation time factor $T_2$ as a multiple thereof and a period of 5–100 times $T_2$ will normally be sufficient to establish steady molecular motion.

As has been indicated, the intensity of the first maximum of the dispersion signal (maximum "$m$" of FIG. 3) is detected in accordance with the present invention. When the intensity of a dispersion signal at the first maximum thereof is detected in accordance with the present invention, the relationship between the detected intensity and the concentration of a nuclear species in the sample may be represented by the following formula:

(I) $$h = KVC_1C_2$$

wherein $h$ equals the detected intensity of the dispersion signal at the first maximum; $V$ equals the effective volume of sample exposed to the crossed primary and radio-frequency magnetic fields; $C_1$ equals the weight per unit volume of the substance to be determined; $C_2$ equals the weight percent of the nuclear species in the sample; and $K$ is a constant derived by solving the above formula utilizing the detected intensity at the first maximum of a dispersion signal derived from a reference sample containing a known percentage of the nuclear species ($K$ being the only unknown factor in the latter situation).

That is to say:

(II) $$K = \frac{h^*}{V'C_1'C_2'}$$

wherein $V'$, $C_1'$, and $C_2'$ have the meaning given above with respect to $V$, $C_1$ and $C_2$ of Formula (I) and wherein $h^*$ is the detected first maximum of intensity for the reference sample containing the known percentage of the nuclear species. The samples should be at the same temperature.

If the unknown and reference samples are contained in sample holders of the same dimensions, the factors $V$ and $V'$ may be eliminated from Equations I and II above or, to the same effect, the constant for Equation I may be expressed in terms of KV; viz:

(III) $$KV' = \frac{h^*}{C_1' C_2'}$$

It will be apparent that if the sample to be analyzed consists of a liquid substance containing the nuclear species, the factor $C_1$ becomes unity as applied in the above formulae.

*Control of Chemical and Refinery Processes By Nuclear Magnetic Resonance Means*

In accordance with the modified form of the present invention, a refining or chemical process is controlled by nuclear magnetic resonance means. In many chemical and refining processes one or more liquid streams will be discharged from a treating zone. It will frequently happen that the content of a nuclear species in one or more of the discharge streams will be indicative of the effectiveness of treatment accomplished in the treating zone and that the effectiveness of treatment may be regulated in response to the content of the nuclear species in such a discharge stream.

Illustrative chemical and refinery processes that may be regulated in this fashion include Fischer-Tropsch synthesis reactions, hydrogen treating reactions such as hydrogenation, hydroforming, autofining, hydrofining, hydrogen finishing, etc., reactions (either thermal or catalytic), alkylation reactions, sulfonation reactions, catalytic and thermal cracking reactions, solvent extraction processes, fractional distillation processes, fractional crystallization processes, etc.

For example, it is customary practice to remove aromatic constituents from a kerosene petroleum fraction to improve the properties of the kerosene product. This may be accomplished in a plurality of manners, including sulfonation of the aromatic components of a kerosene fraction feed stock under conditions such that the aromatic components are selectively reacted with concentrated sulfuric acid. The selective action of the sulfuric acid toward the aromatic components can be regulated by varying temperature, acid concentration, contact time, etc. Aromatic hydrocarbons contain a lesser weight percentage of hydrogen than do the desired paraffinic components of the kerosene fraction. Accordingly, by monitoring a sulfonates-free discharge stream derived from a sulfonation zone in a manner to be described, in order to determine the weight percentage of hydrogen in the product, it is possible to obtain a measure of the extent to which undesirable aromatic components have been removed during the sulfuric acid treating step. The measure thus obtained may then, in turn, be utilized to regulate a process variable such as temperature, contact time, acid concentration, etc., in order to obtain the desired removal of aromatic components whereby a kerosene product substantially free from aromatic components may be obtained.

As an example of a Fischer-Tropsch synthesis, carbon monoxide and hydrogen are reacted at an elevated temperature in the presence of a catalyst selected from Group 8 of the periodic table (e.g., an iron catalyst) in order to form oxygenated organic compounds and hydrocarbons. It is known that the efficiency of the catalytic reaction is, at least in part, dependent upon the amount of carbon deposited on the catalyst in the reaction zone. It is desirable to avoid the formation of excessive carbon deposits and, in a given situation, this may be avoided by, for example, increasing the hydrogen partial pressure in the reactor, increasing total reactor pressure, increasing the ratio of hydrogen to carbon monoxide in the reactor, etc. The extent to which carbon has been deposited on the catalyst is reflected in the amount of conjugated hydrocarbon formed during the synthesis reaction, conjugated material formation increasing as carbon deposition increases. Conjugated hydrocarbons contain a lesser weight percentage of hydrogen than do the saturated hydrocarbons. Accordingly, by obtaining a measure of the total amount of hydrogen in a discharge stream comprising the hydrocarbon product, it is possible to obtain a measure of the amount of conjugated material that has been formed and, as a result, it is possible to regulate one of the reactor variables such as hydrogen partial pressure, total reactor pressure, hydrogen to carbon monoxide ratio, etc., in order to alter reaction conditions in a manner to minimize the formation of carbon deposits on the catalyst.

As an example of hydrogen treatment, it is customary to treat petroleum hydrocarbon fractions with hydrogen at an elevated temperature for various purposes, such as to effect hydrogenation of unsaturated components thereof, reformation of feed stock components, removal of sulfur, conversion of naphthenic components to aromatic components, etc. When petroleum hydrocarbon fractions are treated with hydrogen in this fashion, at least one of the discharge streams from the treating zone will normally have a hydrogen content which is reflective of the effectiveness of the hydrogen treatment. Thus, when unsaturated components are dehydrogenated, the effectiveness of the hydrogenation treatment can be determined by measuring the weight percentage of hydrogen in the product stream to obtain a measure of the extent to which unsaturated components have been hydrogenated. As a result, by regulating temperature, partial hydrogen pressure, ratio of hydrogen to feed stock, etc., it is possible to obtain a desired degree of hydrogenation. When naphthenes are to be converted to aromatics, a measure of the hydrogen in the product discharge stream will be reflective of the extent of treatment, hydrogen content decreasing as naphthenic components in the product discharge stream decrease. As a result, a process variable may be regulated to obtain any desired degree of naphthenic conversion. Other hydrogen treating processes may be regulated in a similar manner.

In a like manner, solvent extraction, fractional crystallization, fractional distillation, etc., processes may be regulated. Thus, in a dewaxing process it is desirable to remove the relatively higher molecular weight paraffinic components from a lubricating oil fraction feed stock component in order to provide a lubricating oil having satisfactory viscosity index and pour point characteristics. This may be accomplished, in general, by diluting the feed stock with a suitable solvent such as propane, methyl ethyl ketone, etc., chilling the diluted feed stock to a temperature below the pour point desired for the lubricating oil product to crystallize the waxy heavier paraffinic components of the feed stock, removing the crystallized wax by any suitable means such as filtration, centrifugation, etc., and separating the thus dewaxed lubricating oil from the solvent. The lubricating oil product will contain aromatic components and, as a result, the hydrogen content of the product will decrease with increased removal of paraffinic components. The amount of wax to be removed may be regulated by varying the charge stock to solvent ratio and it is therefore possible to control the severity of dewaxing in response to a nuclear magnetic resonance spectroscopic measure of the total hydrogen content of the discharge stream.

As another illustration, asphaltic components (which are predominantly of an aromatic nature) can be removed from a petroleum crude oil or a fraction thereof through the addition of propane or other suitable solvent which will cause precipitation of the asphaltic components. As a result, the hydrogen content of the deasphalted charge stock will increase as progressively larger amounts of asphaltic components are precipitated. The ratio of charge stock to precipitant will determine the extent of precipitation so that, as a result, the hydrogen content of the deasphalted charge stock will be indicative of the extent of deasphalting. Thus, the deasphalting process may be regulated by varying the ratio of solvent to charge stock in response to a measurement of the hydrogen content of the deasphalted material.

The foregoing examples are representative of the wide variety of chemical and refining processes that may be controlled in accordance with this embodiment of the present invention. Numerous other examples will be readily apparent to those skilled in the art.

*Control of an Extraction Process*

As another example, the solvent extraction of a lubricating oil fraction may also be controlled by nuclear magnetic resonance means. Briefly, a lubricating oil fraction containing aromatic and paraffinic components is charged to a solvent extraction zone and contacted therein under extraction conditions with a significant amount of a solvent to selectively dissolve the predominantly aromatic components of the charge stock in order to thereby form a raffinate phase predominantly containing paraffinic components and an extract phase containing solvent and predominantly aromatic components. The solvent is then stripped from the aromatic components by any suitable means, such as fractional distillation, for recycle. The paraffinic raffinate phase comprises the desired lubricating oil product. At least a portion of the raffinate is flowed through a sample holder of a nuclear magnetic resonance spectrometer to detect the first maximum of intensity of a dispersion signal of the present invention to thereby obtain a signal which is a direct measure of the total hydrogen content of the raffinate. This signal is then employed to change a process variable, such as the amount of lubricating oil charge stock or the amount of solvent charged to the extraction zone.

As is well-known, the viscosity index of a paraffinic lubricating oil product is dependent on the severity of extraction, since the ratio of solvent to charge stock will determine the efficiency of the extraction operation. That is to say, components of the charge stock which are of a mixed aromatic and paraffinic character may adversely affect the viscosity index of a lubricating oil fraction but are removed from the original charge stock only in the presence of a comparatively larger amount of solvent. Accordingly, by increasing the ratio of solvent to charge stock, the more difficultly extracted predominantly cyclic components may be removed from the predominantly paraffinic component. One solvent that is used to particular advantage in such extraction operations is phenol. Therefore, after determining the desired amount of phenol to be used in a phenol extraction operation for a particular charge stock, it is possible, by measuring the total hydrogen content of the raffinate, to obtain an indication of the quantity of difficultly dissolved aromatic-paraffinic components contained therein. It will be understood that it will usually be necessary to first obtain a correlation between hydrogen content and viscosity index for each charge stock to be used, which correlation will usually be different for each specific charge stock. Such a correlation may be obtained, for example, by phenol extracting a plurality of samples of the charge stock with different known amounts of phenol and then determining the viscosity index of each of the raffinates. After the correlation has been made, the optimum and/or permissible ratio of charge stock to phenol may be established for subsequent phenol extraction operations.

Figure 8:
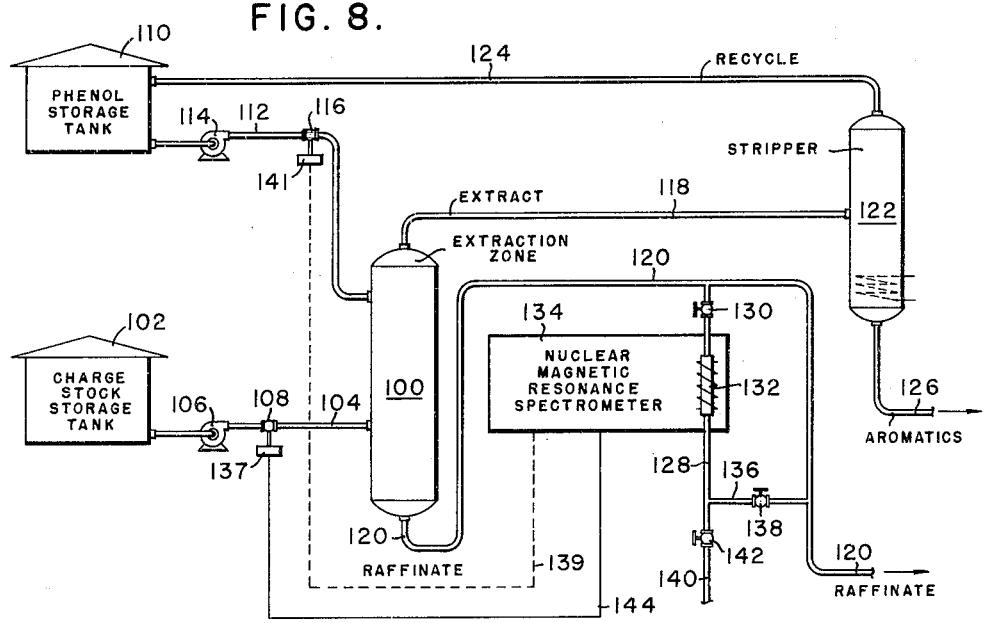
FIG. 8 is a schematic diagram illustrative of a process for controlling an extraction process by nuclear magnetic resonance means.

In accordance with the present invention, therefore, and as a specific example, a phenol extraction operation may be regulated by nuclear magnetic resonance means in the manner schematically shown in FIG. 8.

In FIG. 8 there is shown an extraction zone 100 for use in the phenol extraction of a lubricating oil charge stock contained in the storage tank 102. Charge stock is delivered from the tank 102 by a line 104 containing a pump 106 and controlled by an adjustable, electrically operated valve 108. Phenol is delivered overhead to the extraction zone 100 from a suitable source such as a storage tank 110 through a line 112 containing pump 114 and controlled by an adjustable, electrically operated valve 116. The charge stock and phenol are brought into intimate contact in the extraction zone 100 where the predominantly aromatic components of the charge stock are selectively dissolved in the phenol to form an extract phase which is taken overhead by a line 118 and a raffinate bottoms phase which is discharged from the extration zone 100 by a line 120. The line 118 flows to a suitable stripping device such as a distillation tower 122. In the distillation column 122, the phenol is separated from the aromatic fraction, the phenol being taken overhead by a line 124 for recycle to the storage tank 110. The aromatic components are taken as bottoms from the distillation column 122 through the line 126.

A sample line 128 containing a valve 130 leads from the raffinate line 120 to the sample holder 132 of a nuclear magnetic resonance spectrometer 134. A return line 136 containing a valve 138 returns to the raffinate line 120 and a discharge line 140 containing a valve 142 branches from the return line 136. Electrical lead 144 from the nuclear magnetic resonance spectrometer 134 is connected with a control member 137 for regulating the valve 108 to thereby regulate the rate at which charge stock is delivered to the extraction zone 100 through the line 104. Alternately, lead 139 may be provided to interconnect the detecting means of the nuclear magnetic resonance spectrometer 134 with a control member 141 for regulating the valve 116 in the line 112 which leads from the phenol storage tank 110 to the extraction zone 100.

In operation, a sample of the raffinate flowing through the line 120 is caused to periodically flow through the sample holder 132 by opening valves 130 and 138 (when the sample flow is to be returned to the line 120) or by opening valves 130 and 142 (when the extraction sample is to be discharged from the system), this being accomplished by any suitable means (not shown). After flow has continued for a period of time sufficient to thoroughly flush the sample holder 132, the valves 130 and 138 or 130 and 142, as the case may be, are closed so the portion of the raffinate contained in the sample holder 132 may be brought to a condition of steady molecular motion. The portion of raffinate in the sample holder 132 is then scanned by the nuclear magnetic resonance spectrometer 134 to detect the first maximum of intensity of a dispersion signal which is a direct measure of the total quantity of hydrogen contained in the extract (such dispersion signal having been obtained in a manner described above). If an excess of charge stock, relative to the phenol, is being charged to the extraction zone 100 so that the extracted paraffinic component will have too low a viscosity index, the total hydrogen content of the extract phase will be less than it would be if there were a proper balance between the rate of charge of the phenol and charge stock. In this situation, the signal transmitted through the lead 144 will energize the control member 137 to actuate the valve 108 to decrease the rate of delivery of charge stock to the extraction zone 100. Conversely, if an insufficient amount of charge stock is being delivered, there will be an increase in total hydrogen content of the raffinate phase so that the signal transmitted through the line 144 will energize the control member 137 to actuate the valve 108 to thereby increase the rate of delivery of the charge stock. When the rate of delivery of charge stock is such that a proper ratio of phenol to charge stock is obtained in the extraction zone 100, the control member 137 will not be actuated by the signal transmitted through the lead 144. If desired, the valve 116 in the line 112 leading from the phenol storage tank 110 may be controlled in the indicated manner instead of control valve 108 through the provision of a lead 139 leading from the nuclear magnetic resonance spectrometer 134 to a control member 141 for the valve 116 in the line 112. Substantially the same results are obtainable in this instance.

Control of a Fixed Bed Catalytic Cracking Process

As has been indicated, chemical processes may be controlled by nuclear magnetic resonance means in accordance with the present invention. An example of such a process is a catalytic cracking process wherein a suitable feed stock which may be a gas oil fraction, a de-asphalted oil, and the like, is catalytically cracked in a catalytic cracking zone to produce valuable products. The discharge stream from the catalytic cracking zone is normally fractionated into the various components such as an overhead fraction, a gasoline fraction, a cycle stock fraction and a bottoms fraction. The cycle stock fraction will normally comprise a mixture of aromatic and aliphatic hydrocarbons.

For a given set of cracking conditions, the amount of gasoline product that is produced can be regulated by controlling the amount of cycle stock that is recycled to the catalytic cracking zone, since the aliphatic components of feed stock are more easily cracked than the aromatic components. Thus, as the rate of gasoline production is increased, the relative concentration of the aromatics component of the cycle stock will be increased. As a general rule, it is desired to control catalytic cracking operations so that, for a given feed stock, a cycle stock fraction will be produced which will have an optimum ratio of aliphatics to aromatics. Since the aliphatic components will contain a greater amount of hydrogen than the aromatic components, a determination of the total amount of hydrogen contained in the cycle stock from a given gas oil fraction will be a measure of the relative concentrations of the aliphatic and aromatic components.

In accordance with the present invention, therefore, a catalytic cracking process is controlled by determining the total amount of hydrogen in a catalytic cracking cycle stock by nuclear magnetic resonance spectroscopic means and regulating the rate of recycle in response to this determination. Such a process is shown in FIG. 9.

Figure 9:
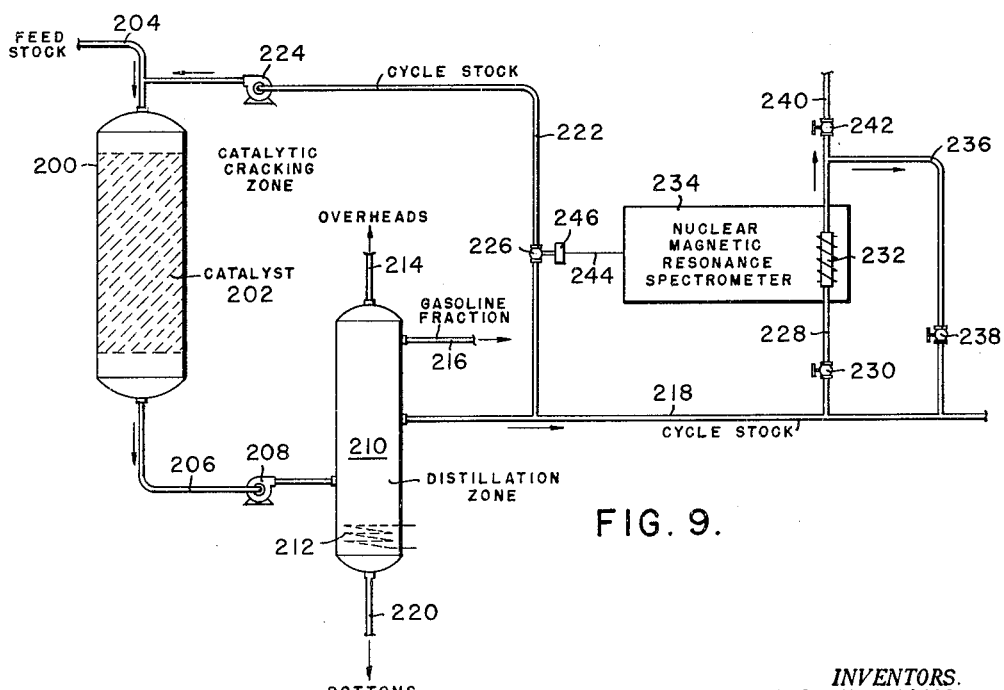
FIG. 9 is a schematic diagram illustrative of a process for controlling a fixed bed catalytic cracking process by nuclear magnetic resonance spectroscopic means.

In FIG. 9 there is shown a catalytic cracking zone (i.e., reactor) 200 containing a fixed bed 202 of a suitable cracking catalyst. A suitable feed stock such as a gas oil fraction is charged to the reactor 200 by means of a line 204. The catalytic cracking product is discharged from the catalytic cracking zone 200 by a line 206 containing a pump 208 and is delivered by the line 206 to a suitable fractionation zone 210 such as a distillation tower containing a heating coil 212. In the distillation tower 210, the catalytic cracking product is fractionated to provide an overhead fraction discharged by the line 214, a gasoline fraction discharged by the line 216, a cycle stock fraction boiling in the gas oil range discharged through the line 218 and a bottoms fraction discharged through the line 220. A portion of the cycle stock flowing through the line 218 is recycled to the catalytic cracking zone 200 by a recycle line 222 containing a pump 224 and controlled by an adjustable electrically operated valve 226. The remaining portion of the cycle stock is discharged from the system by the line 218. In the illustrated process, there is provided a branch line 228 controlled by a valve 230 leading to a sample holder 232 of a nuclear magnetic resonance spectrometer 234. A line 236 controlled by a valve 238 returns from the sample holder 232 to the line 218 and a branch line 240 controlled by a valve 242 discharges from the system.

During catalytic cracking operations, the valve 230 and one of the valves 238 and 242 are periodically opened by any suitable means (not shown) to cause the flow of a sample of cycle stock through the sample holder 232. The valve 238 is opened if the cycle stock flowing through the sample holder 232 is to be returned to the line 218 whereas the valve 242 is opened if the cycle stock is to be discharged from the system by way of the branch line 240.

After flow of cycle stock through the sample holder 232 has continued for a length of time sufficient to thoroughly flush the same, the valve 230 and one of the valves 238 or 242, as the case may be, are closed so that the cycle stock in the sample holder 232 may be brought to a condition of steady molecular motion. The cycle stock in the sample holder 232 is then scanned by the nuclear magnetic resonance spectrometer 234 to obtain a signal constituting a measure of the first maximum of intensity of a dispersion signal obtained in a manner described above and, hence, a measure of the hydrogen content of the cycle stock. The thus-obtained signal is transmitted through a lead 244 to a control member 246 for regulating the valve 226. If the total hydrogen content of the cycle stock, as measured by the nuclear magnetic resonance spectrometer 234, is less than the predetermined optimum value, indicative of the presence of an excess quantity of aromatics, the control member 246 is actuated to decrease the amount of cycle stock flowing through the line 222 through suitable adjustment of the valve 226 whereby the rate of recycle is decreased to thereby restore the desired balance of aliphatics to aromatics in the cycle stock. If, on the other hand, the total hydrogen content of the cycle stock is in excess of the predetermined optimum value, indicative of the presence of an excessive quantity of aliphatics, the control member 246 is actuated to change the setting of the valve 226 so as to increase the flow of cycle stock through the line 222 whereby the rate of recycle is increased. As a result, the predetermined optimum ratio of aliphatics to aromatics in the cycle stock will be reestablished. By monitoring the cycle stock by nuclear magnetic resonance means in the indicated manner, it is therefore possible to positively control the rate of gasoline production in the catalytic cracking zone 200. Alternately, the gasoline production rate can be regulated by changing a process variable such as temperature, contact time, etc., by any suitable means (not shown) in response to the determination of cycle stock hydrogen content.

It is to be understood that the foregoing examples of specific embodiments of the present invention have been given by way of illustration and are not intended as limitations on the scope of this invention since the present invention is susceptible of many modifications, as will be apparent to those skilled in the art.

What is claimed is:

1. In a nuclear magnetic resonance spectroscopic analysis method wherein nuclei of hydrogen contained in a liquid hydrocarbon which is a product obtained from a treating zone comprising a sample are polarized in a primary magnetic field of polarization crossed at right angles by a radio-frequency magnetic field of predetermined frequency and wherein at least a portion of the resonance band of said nuclei of said hydrogen is scanned, said primary magnetic field being modulated with an audio-frequency magnetic field, the improvement which comprises adjusting the frequency and intensity of said auto-frequency magnetic field and adjusting the rate of scan of said resonance band to a value so as to be able to obtain a nuclear magnetic resonance dispersion signal having a substantially wholly positive value with respect to the value outside the resonance band and having a single minimum value at the center of the resonance band of said nuclei of said hydrogen, inductively detecting a maximum intensity of the dispersion component to produce a signal which is a direct measure of the quantity of said nuclei of said hydrogen in said sample and regulating at least one treating variable in said treating zone in response to said signal.

2. A method in accordance with claim 1 wherein the treating zone is a solvent extraction zone, wherein the liquid hydrocarbon is a raffinate stream derived from said solvent extraction zone, and wherein solvent extraction conditions in said solvent extraction zone are regulated in response to the signal.

3. A method in accordance with claim 1 wherein the treating zone is a catalytic cracking zone, wherein the liquid hydrocarbon is a recycle hydrocarbon fraction derived from the catalytic zone, and wherein a catalytic cracking process variable is regulated in response to the signal.

References Cited in the file of this patent

UNITED STATES PATENTS

| | | |
|---|---|---|
| 2,462,995 | Ritzmann | Mar. 1, 1949 |
| 2,799,823 | Shaw et al. | July 16, 1957 |
| 2,913,658 | Burdine | Nov. 17, 1959 |

OTHER REFERENCES

Ayers: Scientific American, vol. 187, No. 3, September 1952, pp. 82 to 93 incl.

Malling: Electronics, April 1953, pp. 184 to 187 incl.

Anderson: Physical Review, vol. 76, No. 10, Nov. 15, 1949, pp. 1460 to 1470 incl.

Procter: Physical Review, vol. 79, No. 1, July 1, 1950, pp. 35 to 43 incl.